(12) United States Patent
Raina et al.

(10) Patent No.: US 11,796,338 B2
(45) Date of Patent: Oct. 24, 2023

(54) AUTOMATED SEMANTIC MAPPING

(71) Applicant: GM CRUISE HOLDINGS LLC, San Francisco, CA (US)

(72) Inventors: Siddharth Raina, San Francisco, CA (US); Matthias Wisniowski, Vienna (AT); Harsha Rajendra Prasad, Hayward, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 680 days.

(21) Appl. No.: 16/731,777

(22) Filed: Dec. 31, 2019

(65) Prior Publication Data
US 2021/0199461 A1      Jul. 1, 2021

(51) Int. Cl.
| G01C 21/36 | (2006.01) |
| G01S 17/89 | (2020.01) |
| G06T 7/11  | (2017.01) |
| G06F 40/30 | (2020.01) |

(52) U.S. Cl.
CPC .......... *G01C 21/3673* (2013.01); *G01S 17/89* (2013.01); *G06F 40/30* (2020.01); *G06T 7/11* (2017.01); *G06T 2207/30181* (2013.01)

(58) Field of Classification Search
CPC ... G01C 21/3373; G01C 21/3804; G06T 7/11; G06T 2207/30181; G06T 2207/20084; G06T 2207/20081; G06T 2207/10028; G06T 2207/30256; G06T 2207/20021; G06T 2207/30184; G06F 40/30; G06F 40/169; G06N 3/0454; G06N 3/0472; G01S 17/89
See application file for complete search history.

(56) References Cited

U.S. PATENT DOCUMENTS

| 10,816,993 | B1* | 10/2020 | Tran | G05D 1/0088 |
| 10,928,830 | B1* | 2/2021 | Tran | B60W 30/12 |
| 2018/0189578 | A1* | 7/2018 | Yang | G01C 21/32 |
| 2019/0051056 | A1* | 2/2019 | Chiu | G06N 3/08 |
| 2019/0147331 | A1* | 5/2019 | Arditi | G06V 20/58 |
| | | | | 706/20 |
| 2019/0286921 | A1* | 9/2019 | Liang | G06F 16/587 |
| 2019/0382007 | A1* | 12/2019 | Casas | G06N 20/00 |
| 2020/0025935 | A1* | 1/2020 | Liang | G01S 17/931 |
| 2020/0210717 | A1* | 7/2020 | Hou | G01C 21/3837 |
| 2020/0210769 | A1* | 7/2020 | Hou | G06N 20/20 |
| 2021/0201526 | A1* | 7/2021 | Moloney | G06N 3/0454 |

* cited by examiner

*Primary Examiner* — John W Miller
*Assistant Examiner* — Sean N. Haiem
(74) *Attorney, Agent, or Firm* — Novak Druce Carroll LLP (57) ABSTRACT

The subject disclosure relates to techniques for improving map labeling and in particular, for automating process of semantically labeling maps used for autonomous vehicle (AV) navigation. In some aspects, a process of the disclosed technology includes steps for receiving a three-dimensional (3D) Light Detection and Ranging (LiDAR) map, processing the 3D LiDAR map to produce a 2D map, rasterizing the 2D map into a plurality of map tiles, and providing one or more of the map tiles to a machine-learning (ML) labeler, wherein the ML labeler is configured to identify and label image features in at least one of the one or more map tiles. Systems and machine-readable media are also provided.

20 Claims, 6 Drawing Sheets

AUTOMATED SEMANTIC MAPPING

BACKGROUND

1. Technical Field

The subject technology provides solutions for map labeling and in particular, producing semantically labelled maps from Light Detection and Ranging (LiDAR) data using machine-learning (ML) techniques.

2. Introduction

Autonomous vehicles (AVs) are vehicles having computers and control systems that perform driving and navigation tasks conventionally performed by a human driver. As AV technologies continue to advance, ride-hailing services will increasingly utilize AVs to improve service safety and efficiency. For effective use in ride-hailing deployments, AVs will be required to execute many service functions that are conventionally performed by human drivers.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Autonomous vehicle (AV) navigation is dependent on the ability of the vehicle to detect and make sense of its surrounding environment. In some implementations these navigation functions are performed by the AV using labeled images of an environment through which the vehicle is navigating. For example, properly labeled images indicating drive able surfaces (e.g., roadways, intersections, crosswalks, and on-ramps, etc.) are used by the AV to make navigation and planning decisions.

In some conventional implementations, image labeling is a manual process performed by human users. In such instances, top-down (2D) images of roadways or other drivable surfaces are labeled, wherein a user indicates geometric boundaries (e.g., polygons) around items of interest (e.g., roadways, crosswalks, or intersections, etc.), and also associates a semantic label with these geometric shapes. By way of example, in labeling an image of a four-way intersection, a human labeler may draw bounding boxes around the four crosswalks, and also indicate a semantic label with each. For example, each bounding box may be tagged to correspond with the label "crosswalk", or another label that uniquely identifies that particular crosswalk, and its associated bounding box.

Due to the manual nature of such labeling efforts, user-assisted image labeling is time consuming and can be prohibitively expensive, especially in areas where changing roadways require frequent re-labeling and semantic processing. Aspects of the disclosed technology address the foregoing limitations of conventional (manual) image labeling techniques by providing automated labeling that utilizes machine-learning (ML) techniques.

In some aspects, a labeling system of the disclosed technology can identify image regions that contain features relevant to AV navigation, and can insert bounding boxes (e.g., polygons) around the identified regions. Additionally, the disclosed labeling system can associate semantic labels with the bounded image regions, for example, to attach semantic labels such as "crosswalk," "drive-able area", "sidewalk," "street", "on-ramp", and/or "parking-space", "keep clear zones", etc. with the bounding polygons.

As discussed in further detail below, machine-learning models of the disclosed technology can be based on machine learning systems that include generative adversarial networks (GANs) that are trained, for example, using pairs of labeled and unlabeled image examples. In some aspects, unlabeled (input) images can be provided based on LiDAR map data for example, that is produced from a rasterized high-resolution three-dimensional LiDAR map. As such, the disclosed labeler can perform image-to-image translation, wherein input images (based on LiDAR data) are labeled through the insertion of geometric bounding boxes and association with semantic labels. Labeled image outputs provided by the labeling system can then be utilized by AVs to quickly determine driving boundaries, and to facilitate navigation and route planning functions.

As understood by those of skill in the art, machine-learning based classification techniques can vary depending on the desired implementation. For example, machine-learning classification schemes can utilize one or more of the following, alone or in combination: hidden Markov models, recurrent neural networks (RNNs), convolutional neural networks (CNNs); Deep Learning networks, Bayesian symbolic methods, general adversarial networks (GANs), support vector machines, image registration methods, and/or applicable rule-based systems. Where regression algorithms are used, they can include but are not limited to: a Stochastic Gradient Descent Regressors, and/or Passive Aggressive Regressors, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Figure 1:
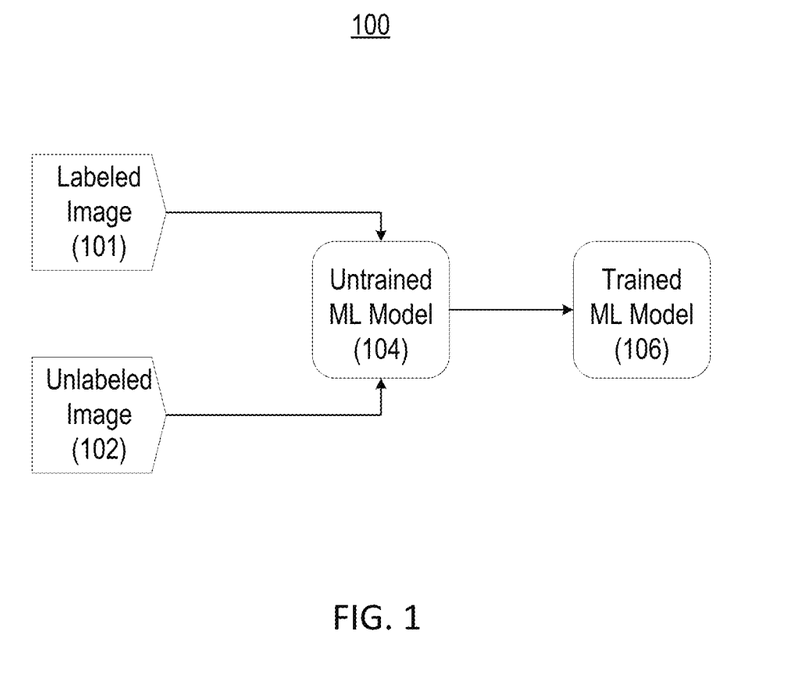
FIG. 1 illustrates an example system used for training a machine-learning (ML) model to perform semantic labeling, according to some aspects of the disclosed technology.

FIG. 1 illustrates an example system 100 used for training a machine-learning (ML) model to perform bounding box labeling (geometric labeling) and semantic labeling, according to some aspects of the technology. As illustrated in system 100, examples of labeled images 101 and unlabeled images 102 are provided to untrained ML model 104. Untrained ML model 104 can include one or more general adversarial networks (GANs), which are configured to learn labeling conventions based on labeled image examples (101). For instance, untrained ML model 104 can learn how geometric bounding boxes (polygons) and semantic labels are to be associated with certain image features. In some aspects, bounding boxes can be colored based on the semantic association. For example, crosswalks can be bounded by yellow colored polygons, whereas intersections may be bounded by red polygons, etc. In other implementations, semantic labels such as metadata word tags can be associated with bounding boxes around salient image features, or associated with the image features directly.

Figure 2A:
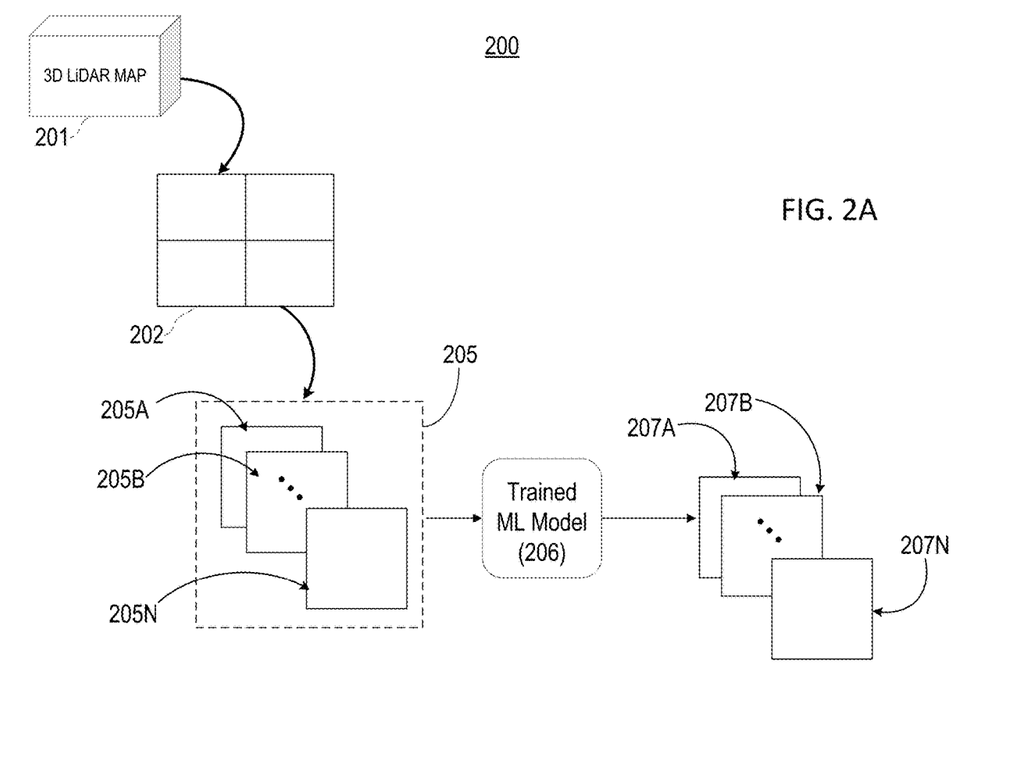
FIG. 2A illustrates a conceptual block diagram of a semantic labeling system, according to some aspects of the disclosed technology.

FIG. 2A illustrates a conceptual block diagram of a semantic labeling system 200, according to some aspects of the technology. In system 200, a LiDAR map (e.g., a high-resolution 3D map) 201 is first converted into a two-dimensional (2D) map 202, for example, using an inverse perspective mapping process or other dimensional reduction technique. The 2D LiDAR map 202 is then segmented (e.g., rasterized) into a plurality of image segments or tiles 205 (e.g., tiles 205A, 205B . . . 205N). Rasterized tiles 205 can retain various types of LiDAR information. For example, each pixel of tiles 205 can include LiDAR reflectivity and height information. In some implementations, reflectivity information can be used to make inferences about map features, such as road features. Similarly, height information, which can include data regarding the height of each pixel (e.g., above sea level), can be used to distinguish various features, such as to distinguish curbs and medians from flat road surfaces.

Each tile is then provided to a trained ML labeling model, such as trained ML model 206. The trained ML model can include one or more neural network architectures, such as a General Adversarial Network (GAN), or a Convolutional Neural Network (CAN). In some aspects, segmentation of the 2D LiDAR map improves label processing by reducing the size of input data provided to ML model 206. Tiling can also facilitate parallel processing, for example, utilizing multiple labeling models (not shown) in a parallel processing architecture.

The outputs of ML model 206 are labeled image tiles 207 (e.g., 207A, 207B . . . 207N). That is, ML model 206 performs an image-to-image transformation, wherein labeled tiles 207 represent labeled image-to-image transformations resulting from processing performed on 2D LiDAR image input tiles 205. In some aspects, input tile dimensions are retained at output. For example, if the pixel dimension of input tiles 205 is 1024×1025, then output tiles 207 can also be 1024×1024. In some aspects, image outputs 207 produced by ML model 206 can each include multiple channels wherein each channel corresponds with an image mask (bitmask) associated with a specific semantic feature. By associating different channels (masks) with semantic features, labeling can be performed by post-processing the masks using a semantic map database to generate vectorized features. That is, the semantic map database can use polygons to store information about semantic labels for different areas (e.g., crosswalks and drive-able areas) and linestrings to store information about lines (e.g., lane boundaries, intersection limit lines, etc.). As such, output tiles 207 can include one or more bounding boxes (polygons) that identify image features salient to AV navigation, such as, crosswalks, sidewalks, roadways, on-ramps, driveways, parking lots, parking spaces, bike-lanes, road-signs, and/or traffic lights, etc. Additionally, in some approaches, semantic labeling associations can be indicated by color coding, wherein bounding box color indicates the enclosed image feature. Alternatively (or additionally) semantic labeling can be performed using metadata tags, for example that provide a word-label for the associated image feature i.e., "crosswalk", "intersection", or "lane boundary", etc.

Figure 2B:
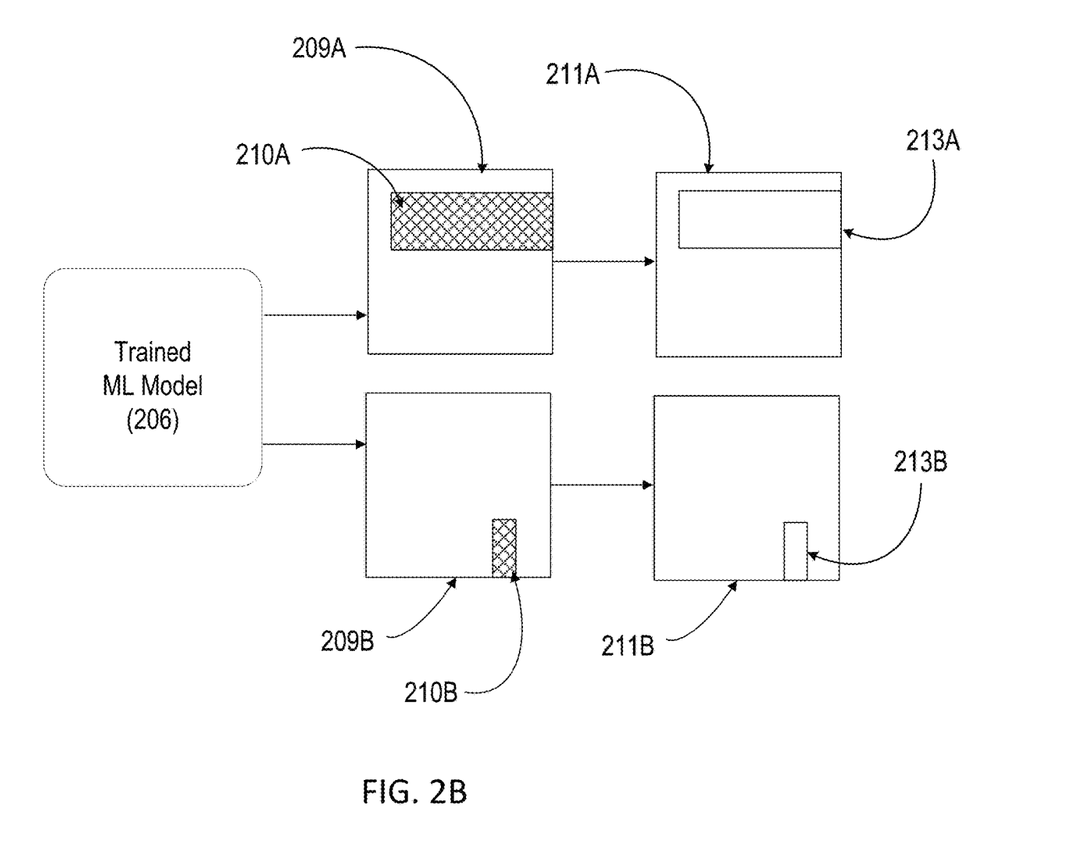
FIG. 2B illustrates a conceptual block diagram of post-processing steps performed to generate semantic labels, according to some aspects of the disclosed technology.

FIG. 2B conceptually illustrates an example of post processing that can be performed on output tiles 207, discussed above. As illustrated, model 206 can output image tiles 209A, 209B that include different channels with an image mask (bitmask) corresponding with different semantic features. For example, image tile 209A containing bitmask 210A is then processed through comparison with a semantic label database, for example, to produce labeled tile 211A, which comprises semantically labeled polygon 213A. In this example, polygon 213A may correspond with an area containing a labeled map feature, such as in intersection.

Further to the example of FIG. 2B, image tile 209B, containing bitmask 210B, can represent a different image feature. For example, once processed using the semantic labeling database, bitmask 210B can correspond with polygon 213B in labeled output image 211B. In this example, polygon 213B can represent a different semantically labeled image feature, such as a lane boundary. It is understood that in some approaches, multiple bitmasks and semantic polygon labels can be present in the same output image, without departing from the scope of the disclosed technology. Additionally, in some approaches, polygon labeling may be performed on bitmasks directly e.g., without using a semantic labeling database.

Figure 3:
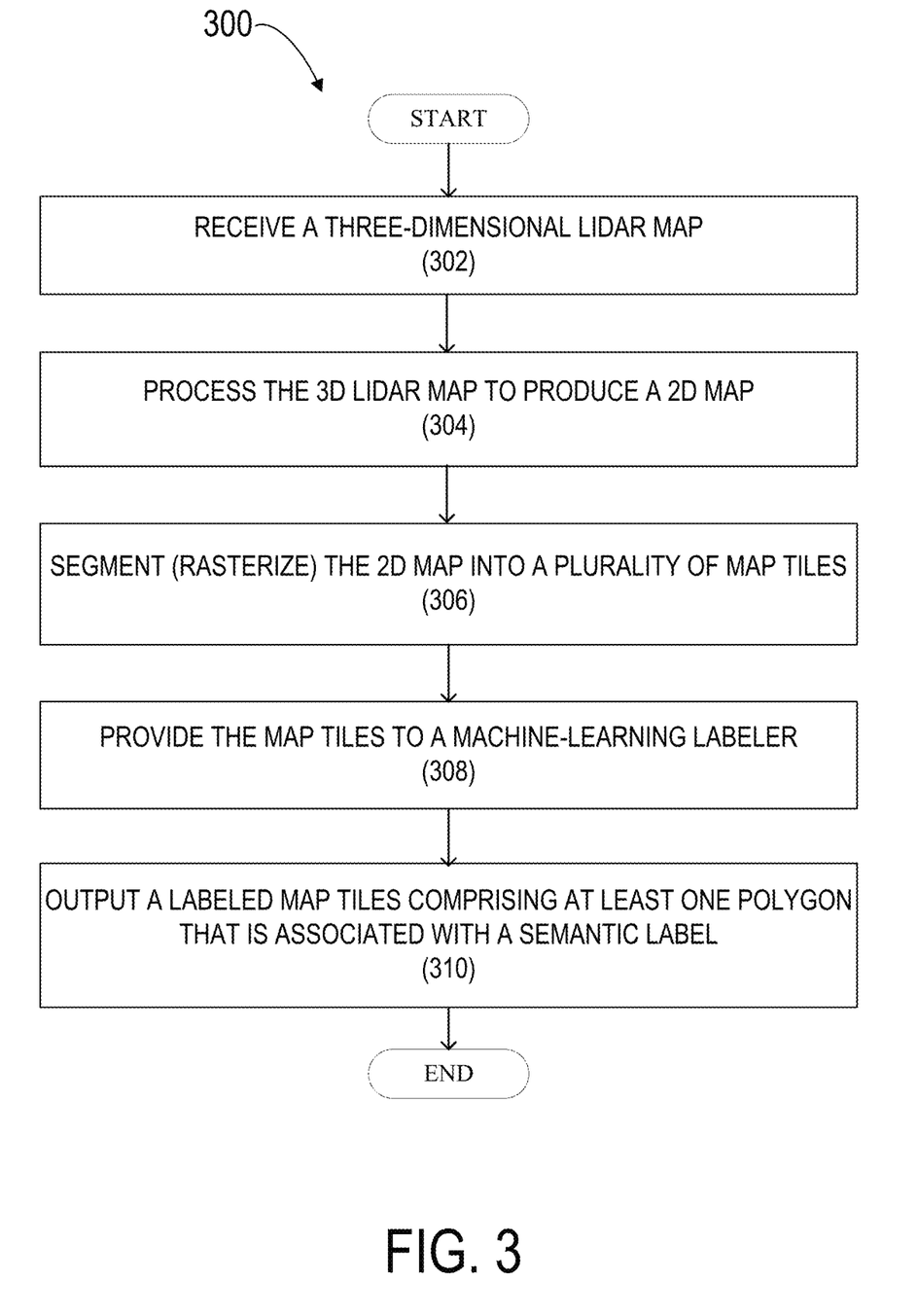
FIG. 3 illustrates steps of a process for performing sematic labeling, according to some aspects of the disclosed technology.

FIG. 3 illustrates steps of a process 300 for performing sematic labeling, according to some aspects of the disclosed technology. Process 300 begins with step 302 in which a three-dimensional (3D) LiDAR map is received. In some aspects, the high-resolution 3D LiDAR map can represent a geographic area, such as a city (e.g., San Francisco, Daegu, or Detroit). The high-resolution map may be generated using LiDAR sensors disposed on various autonomous vehicles (AVs) that navigate and collect data for the surrounding environs.

In step 304, the 3D map is processed into a 2D map. The 2D processing can incorporate a dimensionality reduction technique, such as inverse perspective mapping. Once projected into 2D, the processed (2D) map represents a top-down view of the 3D environs described with respect to step 302. Further to the above example, the 2D LiDAR map can provide a high-resolution image of a top-down view of the streets of San Francisco, or of any other city/environment where the LiDAR data was collected.

In step 306, the 2D map is segmented into a plurality of map tiles. In some implementations a rasterization technique may be used, wherein each map tile represents a segment of the entire 2D LiDAR map area. As discussed above, pixels of the 2D map tiles can retain LiDAR information, such as LiDAR reflectivity and height data. In some implementations, portions of one or more map tiles (input images) can be buffered to improve post-processing. For example, the borders (margins) between 2D map tiles can be buffered to create redundancies that can be cropped out, for example, before output tiles are concatenated during post-processing described below.

In step 308, one or more of the map tiles are provided to a labeling system of the disclose technology. As discussed above, the labeling system can include one or more trained machine-learning models, such as one or more GANs configured to perform labeling. Different types of labeling may be performed, including but not limited to the insertion of bounding polygons (bounding boxes) around salient image objects, and/or the association of semantic labels with image objects and/or their corresponding bounding boxes.

In some aspects, labeling is facilitated by a semantic map database, wherein image masks (bitmasks) in the output tiles are used to create associations with different semantic labels. That is, labeling can be performed by post-processing the masks using the semantic map database, and the resulting output tiles can include one or more bounding boxes (polygons) that identify image features salient to AV navigation.

Depending on the desired implementation, labeled tiles can be stored to a database and provided in an on-demand manner to one or more AVs, upon request. For example, an AV entering a geographic region may request labeled tiles for that region that are necessary or helpful in facilitating navigation and/or route planning functions of the AV.

Figure 4:
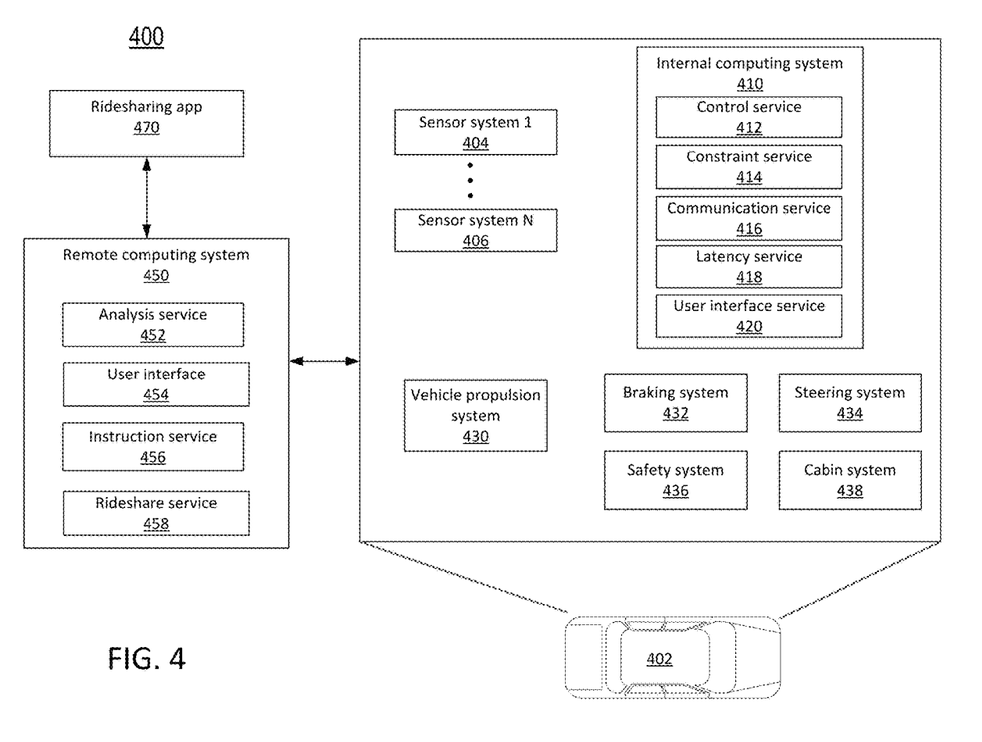
FIG. 4 illustrates an example environment that includes an autonomous vehicle in communication with a remote computing system, according to some aspects of the disclosed technology.

FIG. 4 illustrates environment 400 that includes an autonomous vehicle (AV) 402 in communication with a remote computing system 450. Autonomous vehicle 402 can navigate about roadways without a human driver based upon sensor signals output by sensor systems 404-406 of the autonomous vehicle 402. The autonomous vehicle 402 includes a plurality of sensor systems 404-406 (a first sensor system 404 through an Nth sensor system 406). The sensor systems 404-406 are of different types and are arranged about the autonomous vehicle 402. For example, the first sensor system 404 may be a camera sensor system, and the Nth sensor system 406 may be a LiDAR sensor system. Other exemplary sensor systems include radar sensor systems, global positioning system (GPS) sensor systems, inertial measurement units (IMU), infrared sensor systems, laser sensor systems, sonar sensor systems, and the like.

Autonomous vehicle 402 further includes several mechanical systems that are used to effectuate appropriate motion of the autonomous vehicle 402. For instance, the mechanical systems can include but are not limited to, a vehicle propulsion system 430, a braking system 432, and a steering system 434. Vehicle propulsion system 430 may include an electric motor, an internal combustion engine, or both. The braking system 432 can include an engine brake, brake pads, actuators, and/or any other suitable componentry that is configured to assist in decelerating the autonomous vehicle 402. The steering system 434 includes suitable componentry that is configured to control the direction of movement of the autonomous vehicle 402 during navigation.

Autonomous vehicle 402 further includes a safety system 436 that can include various lights and signal indicators, parking brake, airbags, etc. Autonomous vehicle 402 further includes a cabin system 438 that can include cabin temperature control systems, in-cabin entertainment systems, etc.

Autonomous vehicle 402 additionally comprises an internal computing system 410 that is in communication with the sensor systems 404-406 and the systems 430, 432, 434, 436, and 438. The internal computing system includes at least one processor and at least one memory having computer-executable instructions that are executed by the processor. The computer-executable instructions can make up one or more services responsible for controlling the autonomous vehicle 402, communicating with remote computing system 450, receiving inputs from passengers or human co-pilots, logging metrics regarding data collected by sensor systems 404-406 and human co-pilots, etc.

The internal computing system 410 can include a control service 412 that is configured to control the operation of the vehicle propulsion system 430, the braking system 432 the steering system 434, the safety system 436, and the cabin system 438. The control service 412 receives sensor signals from the sensor systems 404-406 as well communicates with other services of the internal computing system 410 to effectuate operation of the autonomous vehicle 402. In some embodiments, control service 412 may carry out operations in concert one or more other systems of autonomous vehicle 402.

The internal computing system 410 can also include a constraint service 414 to facilitate safe propulsion of the autonomous vehicle 402. The constraint service 414 includes instructions for activating a constraint based on a rule-based restriction upon operation of the autonomous vehicle 402. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 412.

The internal computing system 410 can also include a communication service 416. The communication service can include both software and hardware elements for transmitting and receiving signals from/to the remote computing system 450. Communication service 416 is configured to transmit information wirelessly over a network, for example, through an antenna array that provides connectivity using one or more cellular transmission standards, such as long-term evolution (LTE), 3G, 5G, or the like.

In some embodiments, one or more services of the internal computing system 410 are configured to send and receive communications to remote computing system 450 for such reasons as reporting data for training and evaluating machine learning algorithms, requesting assistance from a remote computing system or a human operator via remote computing system 450, software service updates, ridesharing pickup and drop off instructions etc.

The internal computing system 410 can also include a latency service 418. The latency service 418 can utilize timestamps on communications to and from the remote computing system 450 to determine if a communication has been received from the remote computing system 450 in time to be useful. For example, when a service of the internal computing system 410 requests feedback from remote computing system 450 on a time-sensitive process, the latency service 418 can determine if a response was timely received from remote computing system 450 as information can quickly become too stale to be actionable. When the latency service 418 determines that a response has not been received within a threshold, the latency service 418 can enable other systems of autonomous vehicle 402 or a passenger to make necessary decisions or to provide the needed feedback.

The internal computing system 480 can also include a user interface service 420 that can communicate with cabin system 438 in order to provide information or receive information to a human co-pilot or human passenger. In some embodiments, a human co-pilot or human passenger may be required to evaluate and override a constraint from constraint service 414, or the human co-pilot or human passenger may wish to provide an instruction to the autonomous vehicle 402 regarding destinations, requested routes, or other requested operations.

As described above, the remote computing system 450 is configured to send/receive a signal from the autonomous vehicle 402 regarding reporting data for training and evaluating machine learning algorithms, requesting assistance from remote computing system 450 or a human operator via the remote computing system 450, software service updates, rideshare pickup and drop off instructions, etc.

The remote computing system 450 includes an analysis service 452 that is configured to receive data from autonomous vehicle 402 and analyze the data to train or evaluate machine learning algorithms for operating the autonomous vehicle 402. The analysis service 452 can also perform analysis pertaining to data associated with one or more errors or constraints reported by autonomous vehicle 402.

The remote computing system 450 can also include a user interface service 454 configured to present metrics, video, pictures, sounds reported from the autonomous vehicle 402 to an operator of remote computing system 450. User interface service 454 can further receive input instructions from an operator that can be sent to the autonomous vehicle 402.

Remote computing system 450 can also include an instruction service 456 for sending instructions regarding the operation of the autonomous vehicle 402. For example, in response to an output of analysis service 452 and/or user interface service 454, instructions service 456 can prepare instructions to one or more services of the autonomous vehicle 402 or a co-pilot or passenger of AV 402.

The remote computing system 450 can also include a rideshare service 458 configured to interact with ridesharing application 470 operating on (potential) passenger computing devices. The rideshare service 458 can receive requests to be picked up or dropped off from passenger ridesharing app 470 and can dispatch autonomous vehicle 402 for the trip. Rideshare service 458 can also act as an intermediary between ridesharing app 470 and the AV wherein a passenger might provide instructions to the autonomous vehicle 402 to go around an obstacle, change routes, and/or honk a horn, etc.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 5:
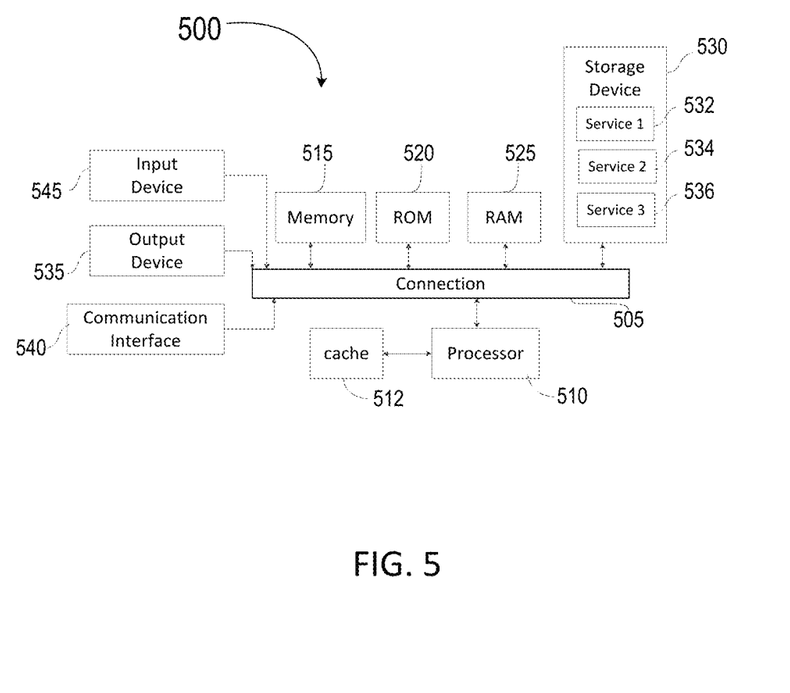
FIG. 5 illustrates an example processor-based system with which some aspects of the subject technology can be implemented.

FIG. 5 shows an example of computing system 500, which can be for example any computing device making up internal computing system 410, remote computing system 450, (potential) passenger device executing rideshare app 470, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that connects various system components including system memory 515, such as read-only memory (ROM) 520 and random-access memory (RAM) 525 to processor 510. Computing system 500 can include a cache of high-speed memory 512 connected directly with, in close proximity to, or integrated as part of processor 510.

Processor 510 can include any processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A computer-implemented method for generating semantically labeled maps, comprising:
   receiving a three-dimensional (3D) Light Detection and Ranging (LiDAR) map;
   projecting the 3D LiDAR map on a two-dimensional (2D) plane to produce a 2D map;
   rasterizing the 2D map into a plurality of map tiles;
   providing the map tiles to a machine-learning (ML) labeler, wherein the ML labeler is configured to identify and label image features in at least one of the map tiles;
   inserting, by the ML labeler, at least one polygon around an image feature in the at least one of the map tiles;
   outputting, by the ML labeler, a plurality of output map tiles including the at least one labeled map tile of the map tiles having labeled image features; and
   concatenating two or more output map tiles of the plurality of output map tiles, wherein
   the ML labeler identifies and labels the image features in at least one of the map tiles by:
     associating, by the ML labeler, a specific image bitmask to one of a plurality of semantic features, wherein the specific image bitmask has a first value for pixels corresponding to the image feature and has a second value—different from the first value—for pixels not corresponding to the image feature; and
     labeling, by the ML labeler, the image feature in the at least one polygon based on the one of the plurality of semantic features associated with the specific image bitmask.

2. The computer-implemented method of claim 1, wherein the labeled map tile comprises the at least one polygon that is associated with a semantic label.

3. The computer-implemented method of claim 2, wherein the semantic label identifies an intersection, a freeway on-ramp, a roadway or crosswalk.

4. The computer-implemented method of claim 2, wherein a color of the polygon is correlated with the semantic label.

5. The computer-implemented method of claim 1, wherein the map tiles are monochrome images.

6. The computer-implemented method of claim 1, wherein the ML labeler comprises a General Adversarial Network (GAN).

7. A system for performing image-object detection comprising:
   one or more processors; and
   a computer-readable medium comprising instructions stored therein, which when executed by the processors, cause the processors to perform operations comprising:
     receiving a three-dimensional (3D) Light Detection and Ranging (LiDAR) map;
     projecting the 3D LiDAR map on a two-dimensional (2D) plane to produce a 2D map;
     rasterizing the 2D map into a plurality of map tiles; and
     providing the map tiles to a machine-learning (ML) labeler, wherein the ML labeler is configured to identify and label image features in at least one of the map tiles;
     inserting, by the ML labeler, at least one polygon around an image feature in the at least one of the map tiles;
     outputting, by the ML labeler, a plurality of output map tiles including the at least one labeled map tile of the map tiles having labeled image features; and
     concatenating two or more output map tiles of the plurality of output map tiles, wherein the ML labeler identifies and labels image features in at least one of the map tiles by:
  associating, by the ML labeler, a specific image bitmask to one of a plurality of semantic features, wherein the specific image bitmask has a first value for pixels corresponding to the image feature and has a second value—different from the first value—for pixels not corresponding to the image feature; and
  labeling, by the ML labeler, the image feature in the at least one polygon based on the one of the plurality of semantic features associated with the specific image bitmask.

8. The system of claim 7, wherein the labeled map tile comprises at least one polygon that is associated with a semantic label.

9. The system of claim 8, wherein the semantic label identifies an intersection, a freeway on-ramp, a roadway or crosswalk.

10. The system of claim 8, wherein a color of the polygon is correlated with the semantic label.

11. The system of claim 7, wherein the map tiles are monochrome images.

12. The system of claim 7, wherein the ML labeler comprises a General Adversarial Network (GAN).

13. A non-transitory computer-readable storage medium comprising instructions stored therein, which when executed by one or more processors, cause the processors to perform operations comprising:
  receiving a three-dimensional (3D) Light Detection and Ranging (LiDAR) map;
  projecting the 3D LiDAR map on a two-dimensional (2D) plane to produce a 2D map;
  rasterizing the 2D map into a plurality of map tiles;
  providing the map tiles to a machine-learning (ML) labeler, wherein the ML labeler is configured to identify and label image features in at least one of the map tiles;
  inserting, by the ML labeler, at least one polygon around an image feature in the at least one of the map tiles;
  outputting, by the ML labeler, a plurality of output map tiles including the at least one of the map tiles having labeled image features; and
  concatanating two or more output map tiles of the plurality of output map tiles, wherein the ML labeler identifies and labels image features in at least one of the map tiles by:
  associating, by the ML labeler, a specific image bitmask to one of a plurality of semantic features, wherein the specific image bitmask has a first value—for pixels corresponding to the image feature and has a second value different from the first value—for pixels not corresponding to the image feature; and
  labeling, by the ML labeler, the image feature in the at least one polygon based on the one of the plurality of semantic features associated with the specific image bitmask.

14. The non-transitory computer-readable storage medium of claim 13, wherein the labeled map tile comprises the at least one polygon that is associated with a semantic label.

15. The non-transitory computer-readable storage medium claim 14, wherein the semantic label identifies an intersection, a freeway on-ramp, a roadway or crosswalk.

16. The non-transitory computer-readable storage medium claim 14, wherein a color of the polygon is correlated with the semantic label.

17. The non-transitory computer-readable storage medium of claim 13, wherein the map tiles are monochrome images.

18. The computer-implemented method of claim 1, wherein the plurality of map tiles include height information including a height of each pixel of the respective map tiles, and the ML labeler uses the height information to identify and label the image features.

19. The system of claim 7, wherein the plurality of map tiles include height information including a height of each pixel of the respective map tiles, and the processors are further configured such that the ML labeler uses the height information to identify and label the image features.

20. The non-transitory computer-readable storage medium of claim 13, wherein the plurality of map tiles include height information including a height of each pixel of the respective map tiles, and the ML labeler uses the height information to identify and label the image features.

* * * * *